// United States Patent [15] 3,694,571
Smith et al. [45] Sept. 26, 1972

[54] FACSIMILE RECORDER MARKING CIRCUIT

[72] Inventors: John W. Smith, Whitestone, N.Y.; Roger A. Pinkham, Lake Hiawatha, N.J.

[73] Assignee: Graphic Transmission Systems, Inc., Hanover, N.J.

[22] Filed: Dec. 7, 1970

[21] Appl. No.: 95,775

[52] U.S. Cl............178/6.6 A, 178/6.6 R, 346/74 ES
[51] Int. Cl........G03g 15/00, H04n 1/14, H04n 1/16
[58] Field of Search......178/6.6 R, 6.6 A; 346/74 ES, 346/74 ESX

[56] References Cited

UNITED STATES PATENTS 3,569,983 3/1971 Marshall ................346/74 ES
3,325,818 6/1967 Nakagawa...............178/6.6 R
3,271,513 9/1966 Marzan................ ..178/6.6 R

*Primary Examiner*—Howard W. Britton
*Attorney*—Ralph L. Cadwallader and Leo M. Kelly

[57] ABSTRACT

A marking circuit for a facsimile receiver in which a low voltage direct current output signal is passed through a modulator with an alternating current. The modulator output is stepped up in voltage and rectified to provide a desired high voltage for electrostatically charging a suitable recording paper for the marking thereof.

3 Claims, 3 Drawing Figures

INVENTORS
JOHN W SMITH AND
ROGER A PINKHAM
BY
Edward V. Conrad
Atty

FACSIMILE RECORDER MARKING CIRCUIT

BACKGROUND OF THE INVENTION

Facsimile systems usually include a transmitter at one location and a recorder at a spaced location connected by a wire or radio system. The transmitter provides a line-by-line dissection of the image of a document or photograph to be transmitted between the transmitter and the recorder. The image dissector includes a drum carrying a helical light slit which is rotatable past a fixed support carrying a straight light slit. The copy is illuminated as it is moved through the transmitter and light reflected from the copy is passed through the image dissector to a photoelectric device for conversion to an analogue type electric signal. At the receiver a readout device converts the analog electric signal to copy. The readout device may be of the type including a plurality of stylii equally spaced on a timing belt adapted to be moved transversely across a strip of recording medium. The recording medium is simultaneously moved lengthwise across the path of the stylii. The received signals are sequentially applied to each stylus as it moves past the surface of the recording medium. The received signals are thus converted back to picture elements on the recording medium so that the information or photograph on the document at the transmitter is reproduced at the receiver.

An extremely satisfactory recording medium is electrostatic paper. The electrostatic recording process includes the steps of applying a charge to a treated paper surface, using the charge to selectively attract particles of a colored toner to the treated surface, and finally applying heat to melt the toner and fix it in position. The charges are selectively applied to line-by-line areas of the treated surface of the paper by the passage of the stylii thereover.

The magnitude of the marking voltage depends somewhat on the design configuration of the recording apparatus. Generally the marking voltage must be of the order of 850 to 900 volts to obtain satisfactory marks, although in some cases voltages as low as 500 volts will produce satisfactory marks.

The recording medium used in the facsimile recorder incorporating the marking circuit of this invention is preferably an electrically conductive base paper coated with a dielectric material. The base paper is preferably a cellulose web containing conductive materials, for example, polymeric quaternary ammonium salt and deliquescent salt or other comparable additives to increase conductivity. The dielectric surfacing medium is one having high resistivity and may be, for example, a copolymer of polyvinyl acetate and polyvinylchloride. A typical caliber is 0.0025 inches, although thinner papers may also be employed. A typical resistivity measurement for the base of the coated paper for the indicated caliber is $10^5$ to $10^8$ ohms per square. Other equivalent hard copy media may also be employed, including thicker papers.

During the recording operation the coated paper recording medium is scanned by means of the stylii. The potential of between 850 and 900 volts direct current is applied between each of the stylii and a backing platen roll through the thickness of the coated paper so that charges accumulate on the dielectric surface coating.

The latent electrostatic image so produced is converted into a visible image by the application and adherence of a triboelectrically charged, pigmented plastic powder called a toner which has a charge opposite to the charge on the dielectric surface. The charge upon the toner is produced by mixing it with a carrier such as spherical iron filings. The carrier is not attracted to the latent electrostatic image during the application of the toner to the charged surface of the coated paper. Fixing of the visible image is accomplished by heating the toner in place on the coated surface so that the toner melts and adheres in position.

SUMMARY OF THE INVENTION

The present invention includes a marking circuit particularly suitable for a facsimile receiver using as a recording medium an electrostatic paper. The marking circuit is controlled by the low voltage direct current output of the recorder amplifier. A modulator is supplied with alternating current of a suitable frequency in the kilocycle range. The direct current analog signal is used to modulate the alternating current, the output of the modulator being increased in voltage by a step-up transformer. The high voltage alternating current marking signal is then rectified to provide a high voltage direct current marking signal.

DESCRIPTION OF THE PREFERRED EMBODIMENT

Figure 1:
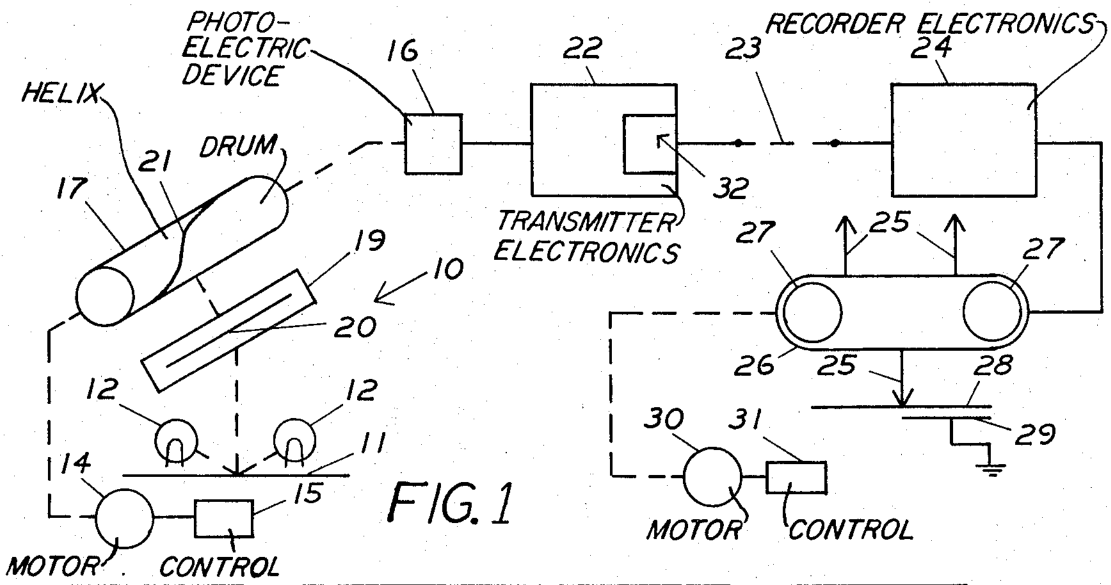
FIG. 1 is a schematic diagram illustrating a facsimile transmitter and receiver in which the receiver incorporates a marking circuit in accordance with the invention.

Referring to the drawings there is shown in FIG. 1 a facsimile transmitter 10 with a piece of copy such as a document or photograph 11 being moved past a pair of viewing lights 12 by a motor 14 operated by a control 15. Interposed between the copy 11 and a photoelectric device 16 is a light dissector including a rotatable helix drum 17 and a fixed member 19 having a straight narrow light slit 20 positioned thereon. The rotatable drum 17 has a helical light slit 21 adapted to cooperate with the light slit 20 so that light reflected from the copy 11 is passed to the interior of the helix drum 17 in a line-by-line image dissection manner. The helix drum 17 may be rotated by the motor 14 or may be driven separately by another motor drive.

The light passed to the interior of the helix drum 17 is picked up by the photoelectric device 16 and passed through the usual transmitter electronics 22 and a transmission line 23 to usual recorder electronics 24. The output is passed to one or more equally spaced stylii 25 carried by a belt 26 passed over a pair of rollers or pulleys 27. A suitable recording medium 28, preferably electrostatic paper, is moved past the transverse path of the stylii 25 and over a grounded platen 29 by a motor 30 supplied by a control supply 31. The recording medium 28, if electrostatic paper, is then toned and the toner set as is well known in the art.

In the operation of the facsimile device the copy 11 is passed by the lamps 12 so that light is reflected through the straight line light slit and helical line light slit in series to the interior of the helix drum 17. This light is picked up by the photoelectric device 16 and converted to an analog signal which is passed through transmitter electronics 22, transmission line 23 and recorder electronics 24 to one of the stylii 25. The electronics is such that a mark is made on the copy medium by the stylii 25 corresponding to a mark viewed by the image dissector drum 17.

Figure 2:
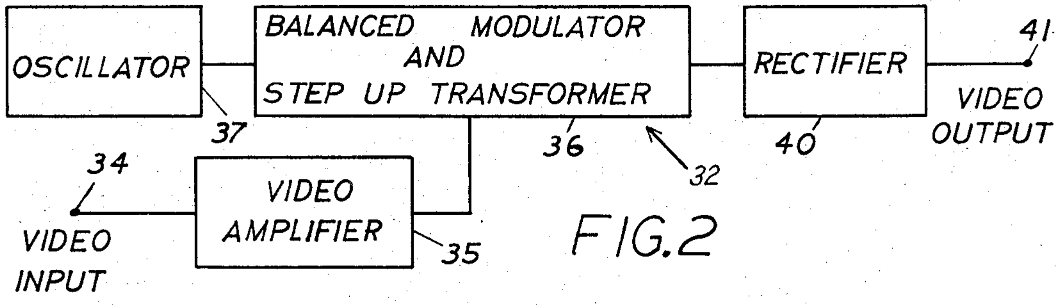
FIG. 2 is a block diagram of a marking circuit in accordance with the invention.

FIG. 2 is a block diagram of a marking circuit in accordance with the invention. This circuit is incorporated in the receiver electronics 24 of FIG. 1. In this circuit low voltage signal pulses are supplied to video input terminal 34. These pulses are amplified in video amplifier 35 and transmitted to a balanced modulator 36. An oscillator 37 supplies the balanced modulator and its output modulated by the signal pulses is raised in voltage by the step up transformer 36, passed through rectifier 40, where the high voltage is rectified thereby providing a direct current high voltage video marking signal at the output 41 of the order of 950 to 1,000 volts.

Figure 3:
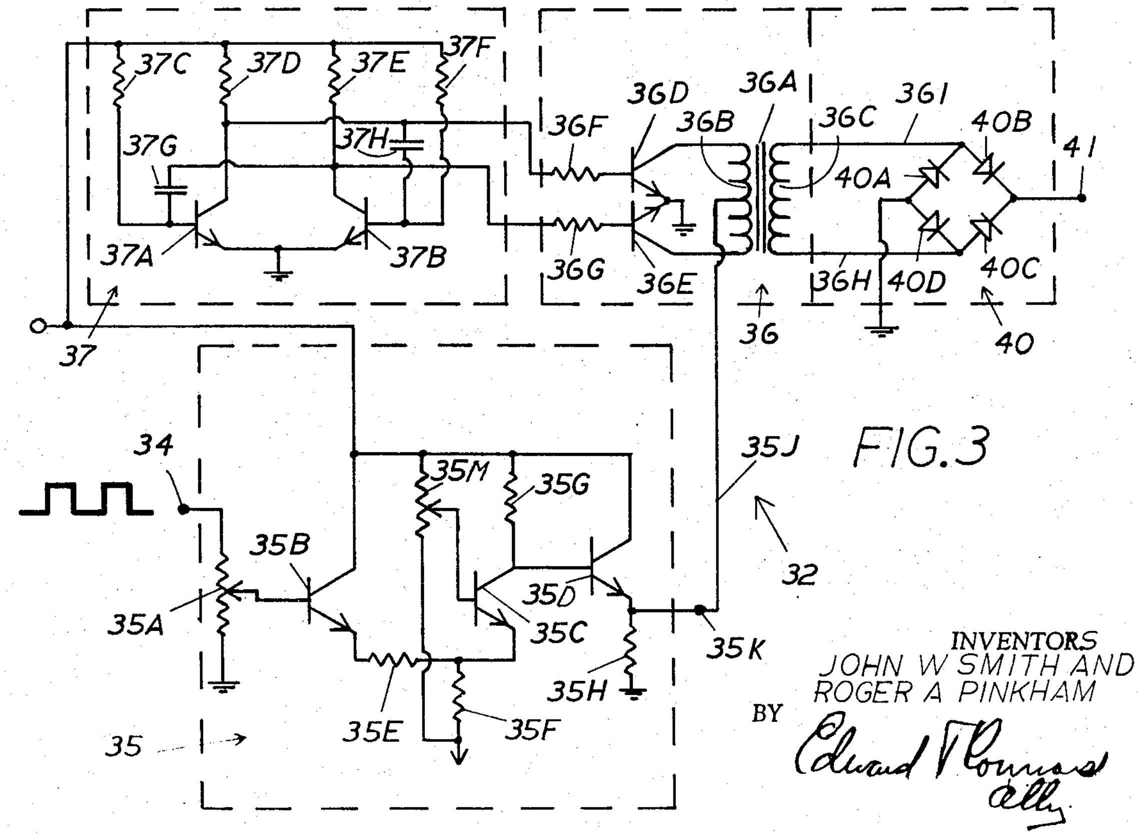
FIG. 3 is a schematic wiring diagram of the marking circuit shown in block diagram in FIG. 1.

FIG. 3 is a schematic wiring diagram of the marking circuit 32. In this circuit the parts are indicated by the same numeral as the corresponding block of FIG. 2, the various circuit elements being indicated using the block number with a letter. The direct current video input in which zero is white and positive is black is applied to the video input 34 and passed through a gain potentiometer **35*a* which supplies the base of a transistor 35*b* in turn supplying a pair of transistors 35*c* and 35*d* connected as cascade amplifiers. A white bias potentiometer 35*m* is used to control the space marking voltage as distinguished from the black gain control 35*a* which is used to control the density of the black marks. Resistor 35*e* in the emitter of transistor 35*b* is used to set the potentials. Resistor 35*f* is the common resistor for the emitter coupled stage. Resistor 35*g* is a collector load for the transistor 35*c* and transistor 35*d* is an emitter follower. The output of the amplifier 35 as indicated at 35*j* is supplied to a combined balanced modulator and step up transformer 36 through lead 35*k*. The combined balanced modulator and step up transformer 36 includes a transformer 36*a* having a center tapped primary winding 36*b* and a secondary winding 36*c* with an increased number of turns with respect to the primary 36b so as to provide a stepped up voltage output from the secondary winding 36*c***.

The oscillator 37 is conventional and includes transistors **37*a* and 37*b*, capacitors 37*g* and 37*h*, and resistors 37*c*, 37*d*, 37*e*, and 37*f*. The oscillator output is applied to base current limiting resistors 36*f* and 36*g* for the switching transistors 36*d* and 36*e* which apply a marking signal to the primary winding 36*b* of the combined balanced modulator and step up transformer 36**.

The high voltage modulated output from leads **36*h* and 36*i* are supplied to the full wave rectifier 40 including diodes 40*a*, 40*b*, 40*c*, and 40*d* connected in a bridge configuration. Thus the marking signal is a full wave rectified video signal without substantial ripple because the modulating step up transformer 36** supplies a good square wave modulated signal.

While the invention has been described and illustrated with reference to a specific embodiment thereof it will be understood that other embodiments may be resorted to without departing from the invention. Therefore, the invention set out above should be considered as illustrative and not as limiting the scope of the following claims.

We claim:

1. A marking circuit for a facsimile recorder using electrostatic paper, the circuit comprising:

a modulator having a step-up transformer with a center tap on the primary winding and a pair of switching transistors connected to the terminals of said primary winding;

a square wave oscillator having its output connected to the switching transistors;

means including an amplifier for amplifying a video input signal and connecting the amplified signal to said center tap of the primary winding to modulate said square wave input to the primary winding; and a rectifier connected across the secondary winding of the transformer for converting the stepped up modulated square wave to direct current voltage.

2. A marking circuit according to claim 1 in which said rectifier is a full wave rectifier.

3. A marking circuit according to claim 1 in which said oscillator produces an output in the kilocycle range.

* * * * *